United States Patent [19]
Ledbetter

[11] Patent Number: 6,103,003
[45] Date of Patent: Aug. 15, 2000

[54] TEXTURED COATING AND METHOD OF APPLYING SAME

[76] Inventor: C. Burgess Ledbetter, 4921 Lake Dr., Memphis, Tenn. 38117

[21] Appl. No.: 09/049,898

[22] Filed: Mar. 28, 1998

[51] Int. Cl.[7] .................................................. C04B 20/00
[52] U.S. Cl. ......................... 106/409; 106/481; 106/482; 106/489
[58] Field of Search .................................. 106/400, 401, 106/409, 481, 482, 489

[56] References Cited

U.S. PATENT DOCUMENTS

| | | | |
|---|---|---|---|
| 3,929,716 | 12/1975 | Komoto et al. | 260/37 EP |
| 4,017,449 | 4/1977 | Audykowski et al. | 260/33.6 EP |
| 4,378,402 | 3/1983 | Below | 428/247 |
| 4,396,723 | 8/1983 | Temple et al. | 501/80 |
| 4,487,805 | 12/1984 | Sellstrom | 428/413 |
| 4,487,806 | 12/1984 | Sellstrom et al. | 428/413 |
| 4,904,709 | 2/1990 | Hermele | 523/220 |
| 4,980,400 | 12/1990 | Sessa et al. | 523/443 |
| 5,114,617 | 5/1992 | Smetana et al. | 252/378 P |
| 5,225,455 | 7/1993 | Sessa et al. | 523/443 |
| 5,618,860 | 4/1997 | Mowrer et al. | 523/421 |
| 5,631,312 | 5/1997 | Takada et al. | 524/5 |

FOREIGN PATENT DOCUMENTS

| | | |
|---|---|---|
| 66172 | 12/1982 | European Pat. Off. . |
| 57-129860 | 8/1982 | Japan . |
| 466274 | 4/1975 | U.S.S.R. . |
| 1763433 | 9/1992 | U.S.S.R. . |
| 1158591 | 7/1969 | United Kingdom . |

OTHER PUBLICATIONS

Fontana et al, Publ. SP–Am. Concr. Inst. (1987), 99 (Polym. Modif. Concr.), pp 51–57, entire document.

Ken Hankinson, How To Fiberglass Boats (2nd ed. 1986), pp. 17–26.

Jack J. Fontana et al., Lightweight Polymer Concrete Composites, in American Concrete Institute, SP–99, Polymer Modified Concrete 51–71 (1987).

Porter Paints, Paints & Coatings Specification Manual (Catalog No. 99, Feb. 99) (6 pages).

Ken Hankinson, Fiberglass Boatbuilding for Amateurs 34–56 (1982).

System Three Resins, Inc., The Epoxy Book 2–4, 21–23, Appendix A, Appendix E (1988).

Mikell P. Groover, Fundamentals of Modern Manufacturing 834–835 (1996).

Sherwin Williams, Macropoxy 846, Product Information (Rev. Jan. 1997).

Sherwin Williams, Macropoxy 846, Application Bulletin (Rev. Jan. 1997).

Sherwin Williams, Macropoxy HS. Product Information (Rev. Jan. 1997).

Sherwin Williams, Macropoxy HS, Application Bulletin (Rev. Jan. 1997).

Sherwin Williams, Solvents, Product Information (Ren. Jan. 1997).

(List continued on next page.)

*Primary Examiner*—Erma Cameron
*Attorney, Agent, or Firm*—Walker, McKenzie & Walker, PC

[57] ABSTRACT

A textured coating and method of applying same. The coating comprises a high-solids polyamide epoxy having a resin and a hardener, and the epoxy is mixed with a texture aggregate filler being selected from the group consisting of perlite, glass microballoons, glass bubbles, phenolic microballoons, Q cel microspheres, and extendospheres, with the filler preferably being expanded perlite of a size such that about 20% maximum by weight is retained on a U.S. Std. Sieve No. 50 and such that about 65% maximum by weight is retained on a U.S. Std. Sieve No. 100. The epoxy and the filler are mixed in about equal volume. The method has the steps of: combining the resin and hardener to create the epoxy, then waiting a sweat-in time for the epoxy, then adding and blending the filler to the epoxy then adding thinner to the blended filler and epoxy to create a mixture of sprayable viscosity; then gently blending the mixture; and then spraying said blended filler and epoxy onto a surface using a spray gun, and then allowing the epoxy coating to cure.

5 Claims, 1 Drawing Sheet

OTHER PUBLICATIONS

Sherwin Williams, Solvents, Application Bulletin (Rev. Jan. 1997).

Grefco Minerals, Inc., General Information Sheet: Dicaperl HP–220 (Dec. 2, 1992).

Grefco Minerals, Inc., Material Safety Data Sheet (Rev. Mar. 12, 1992).

World Minerals, A Diversified International Industrial Minerals Mining, Processing and Marketing Company (1998).

W.W. Grainger, Inc., No. 388 1997 Catalog at p. 2094 ("Spray Guns") (1997).

Central Purchasing Inc., Central Pneumatic Air Paint Sprayer Model 00215, Assembly & Operating Instructions (1997).

Rakoh Lauren, River Rock Tinting Base (1995).

United Gilsonite Laboratories, Maintenance & Repair Products (1997).

Benjamin Moore & Co., Material Safety Data Sheet, Rev. 38800.02B (1990).

Benjamin Moore & Co., Material Safety Data Sheet, Rev. 38700.02B (1990).

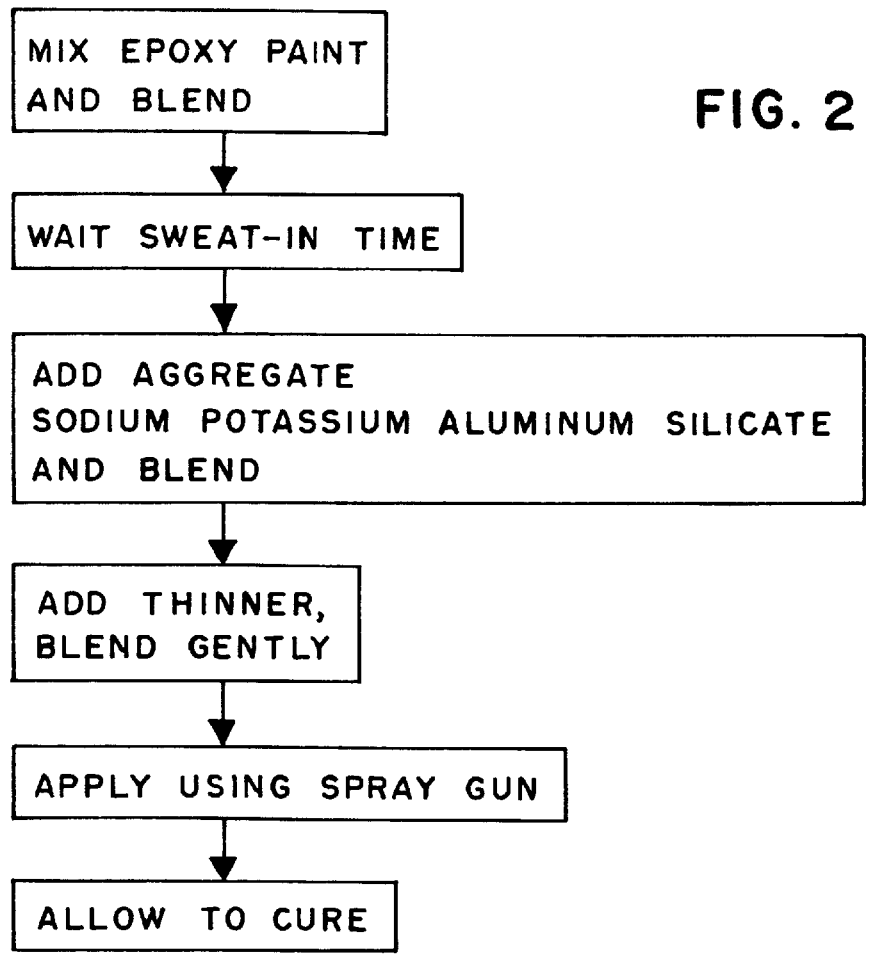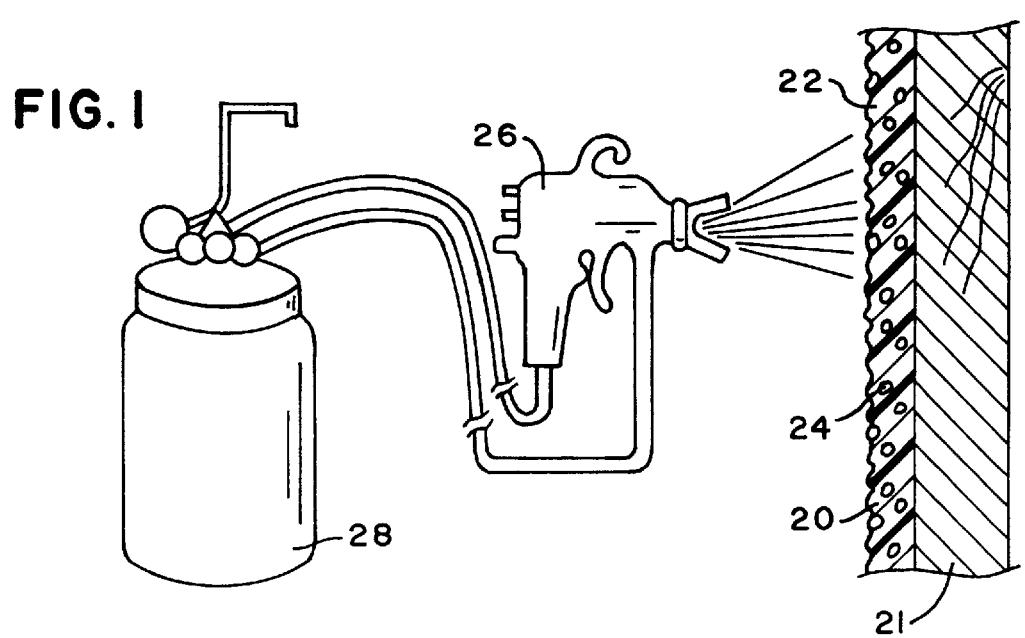

TEXTURED COATING AND METHOD OF APPLYING SAME

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention relates, in general, to coatings for fiberglass, metal, masonry, high-density foam, painted wood and other materials used on the interior and exterior of buildings, and in particular, to textured coatings for use in such architectural applications.

2. Description of the Prior Art

It is often desired to coat building surfaces to simulate limestone and precast concrete, and/or to provide a textured finish to building surfaces to visually soften the surface of otherwise hard and shiny surfaces. Well-known solutions for this problem include heavy-bodied "texture" paints and the like having large and/or heavy aggregate such as river sand or portland cement, as well as latex-based stucco finishes that must be shot through so-called hopper guns or applied using a trowel or a paint roller. Because of the weight and size of aggregate, the thickness of the medium holding the aggregate, and the manner of application (hopper gun, trowel, or roller), known prior art approaches for creating and applying textured coatings have not been able to uniformly distribute the prior art textured coatings onto fine-detail multi-profile building shapes, nor have the prior art coatings and application methods been able to achieve a fine uniform coverage having the look and feel of cut stone. Because of the substantial coating thickness that results when prior art textured coatings are trowelled, rolled, or "hopper gunned" onto a surface, fine surface details become hidden.

It is therefore desirable to have an improved textured coating and method of applying same that is able to cover fiberglass, metal, masonry, high-density foam, painted wood and other materials used on the interior and exterior of buildings providing fine uniform coverage with a durable and hard finish having the look and feel of cut stone and able to withstand years of abuse. Such an improved coating should be able to be applied using a conventional spray gun so that application of the coating can be accomplished after all building panels and trim are installed, thereby permitting on-site covering of all joints, screw heads, etc., without requiring a controlled manufacturing environment. It is further desirable that such an improved coating be provided in various colors. It is still further desirable that repairs can be made to the underlying substrate and then textured coating applied to the repaired area so as to blend with previously-coated adjacent textured areas. Still further, it is desirable to provide a textured surface coating that can be thinly applied using a spray gun so that fine surface details may be preserved.

BRIEF SUMMARY OF THE INVENTION

The present invention is a textured coating comprising an epoxy paint and a texture aggregate filler mixed therein. The coating is applied to building surfaces using a well-known paint spray gun.

It is an object of the present invention to provide an improved textured coating and method of applying same that is able to cover fiberglass, metal, masonry, high-density foam, painted wood and other materials used on the interior and exterior of buildings providing fine uniform coverage with a durable and hard finish having the look and feel of cut stone and able to withstand years of abuse. It is a further object of the present invention to provide an improved textured coating that can be applied using a conventional spray gun so that application of the coating can be accomplished after all building panels and trim are installed, thereby permitting on-site covering of all joints, screw heads, etc., without requiring a controlled manufacturing environment. It is a further object of the present invention to provide an improved coating in various colors and one that enables repairs to be made to the underlying substrate followed by further application of additional textured coating applied to the repaired area so as to blend with previously-coated adjacent textured areas. It is a still further object of the present invention to provide a textured coating that can be thinly applied to a surface using a spray gun so that fine surface details can be preserved.

BRIEF DESCRIPTION OF THE SEVERAL VIEWS OF THE DRAWING

FIG. 1 is a pictorial view (not to scale) of a spray gun applying the coating of the present invention (shown in a sectional view).

FIG. 2 is a flow diagram showing preferred steps in the method of the present invention.

DETAILED DESCRIPTION OF THE INVENTION

Referring to FIG. 1, the sprayable textured coating 20 of the present invention, shown being sprayed onto a surface 21, comprises an epoxy paint 22 into which is mixed a texture aggregate filler 24. It shall be understood that the scale of the coating 20 and surface 21 is greatly exaggerated, for the sake of illustration, with respect to the spray gun 26 and supply vessel 28. Surface 21 may be, for example, fiberglass, metal, masonry, high-density foam, painted wood and other materials used on the interior and exterior of buildings.

The epoxy paint 22 includes a resin and a hardener in a manner well-known to those skilled in the art, and the epoxy paint 22 is preferably a well-known high-solids polyamide epoxy coating such as that sold under the trademark MACROPOXY 846 (winter grade epoxy) and under the trademark MACROPOXY HS (high solids epoxy), both manufactured by the Sherwin Williams Company. For outdoor application in cold weather down to 35° Fahrenheit (1.7° Celsius), MACROPOXY 846 epoxy coating is the preferred epoxy coating. For warm weather, epoxy paint sold under the trademark TNEMIC has been found to work adequately, but MACROPOXY HS epoxy coating is preferred for use with the present invention.

Both varieties of MACROPOXY epoxy coating have low VOC ratings and can be used over marginally-prepared surfaces, and the resin and hardener are mixed in 1:1 ratio, by volume.

The MACROPOXY 846 epoxy coating will dry to touch in one hour at 40° Fahrenheit (4.4° Celsius) in 50% relative humidity and in 45 minutes at 75° Fahrenheit (23.9° Celsius)

in 50% relative humidity, and will fully cure in about seven days. The MACROPOXY 846 epoxy coating has a so-called "sweat-in" time, after mixing the resin and hardener and before application, of 30 minutes at 35° Fahrenheit (1.7° Celsius) in 50% humidity and of 15 minutes at 75° Fahrenheit (23.9° Celsius) in 50% relative humidity. If thinning of the MACROPOXY 846 epoxy paint is desired for spraying, the manufacturer recommends thinning with a polyurethane solvent reducer sold by Sherwin Williams under the trademark R7K15.

The MACROPOXY HS epoxy coating will dry to touch in four to six hours at 77° Fahrenheit (25° Celsius) in 50% relative humidity, and will fully cure in about seven days. The MACROPOXY HS epoxy coating has a so-called "sweat-in" time, after mixing the resin and hardener and before application, of 15 minutes at 77° Fahrenheit (25° Celsius) in 50% relative humidity. If thinning of the MACROPOXY HS epoxy paint is desired for spraying, the manufacturer recommends thinning with a blended solvent reducer sold by Sherwin Williams under the trademark R7K54.

The texture aggregate filler 24 that is mixed with the epoxy paint 22 preferably consists of expanded perlite.

Perlite is a well-known generic term for naturally occurring silicous rock, namely, sodium potassium aluminum silicate, typically of volcanic origin. The distinguishing feature that sets perlite apart from other volcanic glasses is that, when heated to a suitable point in its softening range, perlite expands from four to twenty times its original volume. This expansion is known to be due to the presence of two to six percent combined water in the crude perlite rock. When quickly heated to above 1600° Fahrenheit (871° Centigrade), the crude rock pops in a manner similar to popcorn as the combined water vaporizes and creates countless tiny bubbles, which account for the amazing light weight and other well-known exceptional properties of expanded perlite. This expansion process also creates perlite's white color, and the color of expanded perlite ranges from snowy white to grayish white. Because perlite is a form of natural glass, it is classified as chemically inert and has a pH of approximately 7.

A suitable and preferred aggregate for use in the coating of the present invention is hollow glass microspheres of expanded perlite sold under the trademark DICAPERL and manufactured by Grefco, Inc., 3435 W. Lomita Boulevard, Torrance, Calif. 90509. The DICAPERL expanded perlite is amorphous mineral silicate (sodium potassium aluminum silicate of volcanic origin) containing a low percentage (less than 1%) of crystalline silica, and this aggregate has a variety of sphere sizes denoted by product sizes DICAPERL HP-120, HP-220, HP-520, and HP-820. The preferred size for use with the coating of the present invention is DICAPERL HP-220, and experimental testing has shown that this size produces a pleasing textured finish that is easily sprayed using conventional spray guns. The DICAPERL HP-220 size of expanded perlite has a bubble shape, is of a dry powder form, and is of a size such that about 20% maximum by weight is retained on a U.S. Std. Sieve No. 50 and such that about 65% maximum by weight is retained on a U.S. Std. Sieve No. 100.

DICAPERL expanded perlite is commonly used in the fiberglass industry as a lightweight filler for extending resin and for lightweight putties. Such fillers are relatively inert organic or inorganic materials that are added to plastics resins or gel coats for special flow characteristics, to extend volume, and to lower the cost of a fiberglass article being produced. DICAPERL expanded perlite belongs to a group of fillers called "lightweight fillers" that are able to reduce densities to those approaching wood. Such lightweight fillers are able to do this because they contain an air void that displaces volume and lowers the bulk density. While there are various types of lightweight fillers, they are all fragile and can be easily broken with high shear mixing. Once the particle has been fractured, the lower weight advantage is lost. There are several known lightweight fillers, namely, the group consisting of perlite, glass microballoons glass bubbles, phenolic microballoons, Q cel microspheres, and extendospheres.

The texture aggregate lightweight filler used in the coating of the present invention is selected to provide the fine texture required on the finished surface and to be of sufficiently small size so as to pass through the spray nozzle of a spray gun, and also is chosen because of the lightweight nature of the filler, thereby enabling the textured epoxy mixture to be siphoned up into the spray gun head of a siphon spray gun as well as through the hoses and gun head of pressure spray paint guns.

Early experimental testing was done using linear polyurethane paint as the medium to which the aggregate filler was added rather than high-solids polyamide epoxy being used as the medium, but the linear polyurethane paint with aggregate filler was found to be markedly inferior to the epoxy with aggregate filler, and use of the linear polyurethane paint with aggregate filler was discovered to require that another coat of linear polyurethane paint (without aggregate filler) be applied on top of the linear polyurethane paint with aggregate filler in order to achieve even a minimally acceptable hard surface.

Referring to FIGS. 1 and 2, the method of the present invention preferably includes a number of steps.

First, the well-known high-solids polyamide epoxy paint is mixed according to the manufacturer's specified proportion, usually one part resin base to one part hardener. The epoxy is then thoroughly power blended in a manner well-known to those skilled in the art.

Next, the epoxy is allowed to sit for its manufacturer-recommended "sweat-in" time, usually 15 to 30 minutes, depending on temperature.

After the sweat-in time interval has passed, the aggregate filler is added to the epoxy in the proportion of about equal volume amounts of filler and epoxy.

Next, the epoxy paint manufacturer's specified thinner/reducer is added until the mixture of filler and epoxy is of sprayable viscosity. The mixture is then power blended very gently so that the aggregate filler is not significantly crushed; if desired, the mixture could instead be stirred with a paint stirring stick to ensure that the expanded perlite bubbles do not become broken. As is well-known to those skilled in the art, sprayable viscosity is influenced by temperature and brand of epoxy paint, and those skilled in the art of using paint spray guns are well-practiced in adjusting viscosity to produce a sprayable viscosity, often by trial and error until the paint flows acceptably through the spray gun's tip, and it is highly desirable only to use as little thinner/reducer as is needed. Additionally, the air pressure for the spray gun can be adjusted, in a manner well-known to those skilled in the art, to compensate for variations in viscosity and to adjust for the particular spray gun and air compressor, as suggested by the manufacturer of the particular spray gun.

Two types of paint spray guns are recommended for use with the method of the present invention, namely, either a well-known siphon spray gun or a pressure-feed type spray gun. Examples of such well-known spray guns are the non-bleeder, siphon feed type spray gun sold by W. W. Grainger, Inc., under the trademark Speedaire Professional Spray Gun No. 2Z366; the pressure-feed type spray gun sold by Central Purchasing Inc., under the trademark Central Pneumatic Air Paint Sprayer Model 00215 (with the gun tip being replaced with a tip from a Central Pneumatic Model P30224 paint spray gun, having a tip size inner diameter of 1.8 mm, for spraying the aggregate filler of the present invention).

Next, after the filler and epoxy mixture has been thinned/reduced to a sprayable viscosity, the mixture is poured into the supply vessel for the particular type of spray gun. It has been found that the mixture must be thinned/reduced to a greater degree if a siphon spray gun is used rather than a pressure-feed type spray gun.

Next, the coating mixture is sprayed onto the desired building surface or substrate, holding the gun head at the same distance from the surface as would be used in any other spray painting situation. If the coating mixture appears too wet, the operator simply increases the distance to the surface by an inch (2.54 cm) or so. When the applied coating texture becomes satisfactory, the distance to the surface and the speed of passing the spray gun over the surface is then maintained for the remainder of the painting job.

If the textured surface is inadvertently sprayed on too wet so that the surface texture appears too smooth, subsequent passes can be made over the surface after the coating has become partially cured, which can be determined by making occasional small spray passes over the previously-sprayed surface to see if the desired texture is maintained. If the surface texture cures to be too dry and the aggregate flakes off, a batch of the epoxy paint without the aggregate can be prepared and sprayed lightly on the surface to seal the flaking aggregate surface. If certain areas of the building surface (e.g., around doors and columns where frequent contact is expected) require additional durability, then a similar coating of epoxy paint without aggregate can be sprayed on such areas.

The texture-coated surface is then left to cure for the recommended curing time for the epoxy.

Finally, if another color (other than the color of the epoxy paint) is required for the textured surface, a light coat of paint can be sprayed over the textured surface, taking care that the coat is light enough not to fill the texture, and that about 24 hours of curing time has passed to allow the base texture coating to partially cure. Testing has shown that a variety of non-textured paints, including latex, enamels, acrylics, urethanes, and epoxy paints, can be used for this light top coat of paint while still preserving the textured finish.

Testing has shown that there is minimal overspray with the coating of the present invention when applied in the manner described, and what minimal overspray that is present exhibits the characteristics similar to "dry fall" so as to permit easy cleanup.

Testing has shown that, because the textured coating of the present invention is applied using a spray gun rather than by use of a trowel, a roller, or a hopper gun, the application area can be closely controlled, without excessive masking of adjacent surfaces, simply by holding a shield over the adjacent areas that are to remain uncoated.

Testing has shown that seams, caulked joints, floated seams, filled countersunk screw holes and other surface features can be covered by using the method of the present invention, and that repairs can be easily made because the textured coating can be applied over previously-applied texture without being obvious.

Although the present invention has been described and illustrated with respect to a preferred embodiment and a preferred use therefor, it is not to be so limited since modifications and changes can be made therein which are within the full intended scope of the invention.

I claim:

1. A sprayable textured coating, said coating being of sufficient texture size and viscosity so as to be sprayable through a paint spray gun nozzle having an inner diameter of 1.8 mm, said coating comprising:

(a) an epoxy paint; said epoxy paint comprising a resin and a hardener; and (b) a texture aggregate filler mixed with said epoxy paint, said filler being selected from the group consisting of perlite, glass microballoons, glass bubbles, phenolic microballoons, and microspheres.

2. A sprayable textured coating, said coating being of sufficient texture size and viscosity so as to be sprayable through a paint spray gun nozzle having an inner diameter of 1.8 mm, said coating comprising:

(a) a polyamide epoxy paint; said epoxy paint comprising a resin and a hardener; and (b) a texture aggregate filler mixed with said epoxy paint, said filler comprising expanded perlite.

3. The coating as recited in claim 2, in which said perlite is of a size such that about 20% maximum by weight is retained on a U.S. Std. Sieve No. 50 and such that about 65% maximum by weight is retained on a U.S. Std. Sieve No. 100.

4. The coating as recited in claim 2, in which said epoxy paint has a first volume and said filler has a second volume about equal to said first volume.

5. The coating as recited in claim 4, in which said perlite is of a size such that about 20% maximum by weight is retained on a U.S. Std. Sieve No. 50 and such that about 65% maximum by weight is retained on a U.S. Std. Sieve No. 100.

* * * * *